United States Patent [19]
Beun et al.

[11] 3,890,596
[45] June 17, 1975

[54] METHOD OF AND DEVICE FOR DETERMINING SIGNIFICANT POINTS OF CHARACTERS

[75] Inventors: Mattijs Beun; Pieter Reijnierse, both of Emmasingel, Eindhoven, Netherlands

[73] Assignee: U.S. Philips Corporation, New York, N.Y.

[22] Filed: June 5, 1973

[21] Appl. No.: 367,168

Related U.S. Application Data

[63] Continuation of Ser. No. 196,936, Nov. 9, 1971, abandoned.

[30] Foreign Application Priority Data

Nov. 12, 1970 Netherlands ....................... 7016537

[52] U.S. Cl. .................. 340/146.3 MA; 340/146.3 J
[51] Int. Cl. ............................................ G06k 9/12
[58] Field of Search ......... 340/146.3 AE, 146.3 AC, 340/146.3 R

[56] References Cited

UNITED STATES PATENTS

| | | | |
|---|---|---|---|
| 3,245,036 | 4/1966 | Grottrup | 340/146.3 AE |
| 3,671,941 | 6/1972 | Takahashi et al. | 340/146.3 AE |

OTHER PUBLICATIONS

McCormick, "ILLIAC III,"IEEE Transactions on Electronic Computers, Vol. EC-12, No. 5, Dec. 1963, pp. 798-802.

*Primary Examiner*—Gareth D. Shaw
*Assistant Examiner*—Leo H. Boudreau
*Attorney, Agent, or Firm*—Frank R. Trifari

[57] ABSTRACT

In a method of recognizing characters on a matrix, the characters are imaged as skeleton characters and the significant points of these skeleton characters are marked for ready recognition. Significant points are, inter alia, end points and junctions of series of character positions. The same method is used for matrices of different construction.

5 Claims, 9 Drawing Figures

INVENTORS
MATTHIJS BEUN
PIETER REIJNIERSE
BY
AGENT

INVENTORS
MATTHIJS BEUN
PIETER REIJNIERSE
BY
AGENT

INVENTORS
MATTHIJS BEUN
PIETER REIJNIERSE
BY
AGENT

INVENTORS
MATTHIJS BEUN
PIETER REIJNIERSE
BY
AGENT

METHOD OF AND DEVICE FOR DETERMINING SIGNIFICANT POINTS OF CHARACTERS

This is a continuation of application Ser. No. 196,936,filed Nov. 9, 1971, now abandoned.

The invention relates to a method of determining significant points of characters which are imaged on a two-dimensional regular pattern of positions. The character position is distinguished from a background position by digital information present, whereby at least the information of said characters which determines which character positions are associated with the associated skeleton characters is present. The stroke elements of said skeleton characters consists of a single series of character positions which succeed each other in accordance with an adjacency criterion, each position having a first number of neighboring positions. The neighboring positions forming a ring about a position, possible together with a second number of other positions, which number may include void positions. This method is used in character recognition. It has been observed that characters can often be readily recognized merely on the basis of the said skeleton characters, as much redundant information has then been removed, while sufficient characteristics are still present to guarantee correct recognition. It appeared that the information of the significant points of the skeleton character can be readily used as a basis for recognition. The significant points include end points, three-, four- and n-stroke junctions, but not isolated points. The formation of skeleton characters from the characters is described, for example, in U.S. patent application Ser. No. 196,936 and U.S. Ser. No. 196,950 which has matured into U.S. Pat. No. 3,735,349 both of which were filled simultaneously with the present Application. However, the skeleton characters may also be imaged directly as such. To this end, the invention is characterized in that during a cycle of the positions of a ring encompassing a character position, it is counted how many times a character position is directly followed by another position, from which the number of series starting from said character position can be determined.

By making use of the criterion that a character position which is directly followed by a background position signifies a series of character positions starting from the central character position, a corresponding treatment is obtained for other patterns having, for example, three, four, six, or eight neighbors per position.

A loop may then arise, which is a series of character positions which succeed each other in accordance with said adjacency criterion, said series having the smallest possible length in said regular pattern, the same symmetry as said regular pattern, and being shorter than said ring. In the case of four, six and eight neighbors, a ring, consequently has eight, six and eight positions, respectively, and a loop has four, three and four positions, respectively. It appears that in that case the number of junctions found is too low. In order to avoid this, an advantageous method according to the invention is characterized in that all but one of the character positions of that loop are then marked as connection points, the remaining character position being marked as a junction from which as many of said series of character positions start as said loop has character positions. As a result, virtually always a correct number of said series is signalled. In theory, it is possible to design very complicated combinations of many junctions where an error occurs. These cases, however, never occurred in a large number of test characters of complicated structure.

It may be of importance to reduce the number of junctions. To this end an advantageous embodiment of the method according to the invention is characterized in that at least two junctions, situated within a given maximum distance from each other, (it being possible for said distance to be zero) can be joined in that the total number of said series exceeding two per junction is associated with a character position as an additional mark, so that said newly marked character position is marked at least as a four-stroke junction. If said maximum distance is zero, only coinciding junctions are combined, which occurs when the same position is, e.g. twice marked as a three-stroke junction. In the case of a finite distance, one of the junctions can be changed into at least a four-stroke junction, but it may also be another character position, for example, that one which is nearest to the centre of gravity of the figure formed by said junctions. In this case these junctions may also have a different weight.

The invention also relates to a device for determining significant points of characters which are imaged on a two-dimensional regular pattern of positions, a character position being distinquished from a background position by digital information present, at least that information of said characters which determines which character positions are associated with the associated skeleton characters, being present in a store, from where this information can be transferred to a treatment device. For counting the number of series of character positions starting from a character position, the invention is characterized in that a counter is provided which compares the information of the positions of a ring of positions around a character position and which counts, around said ring the number of times a character position is directly followed by another position, it being possible for said other position to be a background position or a void position, the said counter generating an output signal which corresponds to this number. A counter of this kind can be readily realized.

In order to be able to produce the correct total number of said series also in the case that a large number of character positions, each having many neighbors, is present in a comparatively small area of said regular pattern, a preferred embodiment according to the invention is characterized in that a loop detector is provided which receives the information of all character positions associated with a loop and which, in the case that all positions of said loop are character positions, generates a junction output signal by which the information of one of the character positions of said loop is changed into that of a junction from where as many of said series of character positions start as said loop comprises character positions. A loop detector of this kind can also be readily realized. Moreover, in this way the total number of series of character positions is almost always equal to the number found by intuition.

In order to reduce the number of junctions without undue reduction of the total number of said series, another preferred embodiment according to the invention is characterized in that a coincidence detector is provided which detects whether at least two junctions are situated within a given maximum distance, it being possible for said distance to be zero, and which, upon detection of these junctions, applies signals thereof to a joining device which also receives the stored information of those junctions and which associates additional information with the information of one character position, which is then marked at least as a four-stroke junction, and which changes the other junctions detected by the coincidence detector into connection points. In this way the recognition is often facilitated.

The invention will now be described with reference to the accompanying drawing, in which:

FIG. 1 shows a skeleton character 4 in which for each character position, it is indicated whether it constitutes an end point, a connection point or a junction; this is denoted by a "1", a "2" and a "3", respectively. In this case all eight edge points of a matrix of 3×3 positions are counted as neighbors of the central point.

Consequently, two three-stroke junctions are situated closely together, and furthermore four end points.

FIGS. 2A–D show a number of regular patterns of positions having three, four, six and eight neighbors per position, respectively. Patterns having other numbers, for example, five and 12, are also possible, but these are not frequently used. Moreover, in the case of a larger number of neighbors, various kinds of neighborliness arise, which is already noticeable in the case of eight neighbors: the diagonals are longer than the straight connections. It is possible, however, to reduce the degree of symmetry by changing one of the scales or angles: for example, the elementary square in FIG. 2B can be changed into a rectangle.

Figure 3:
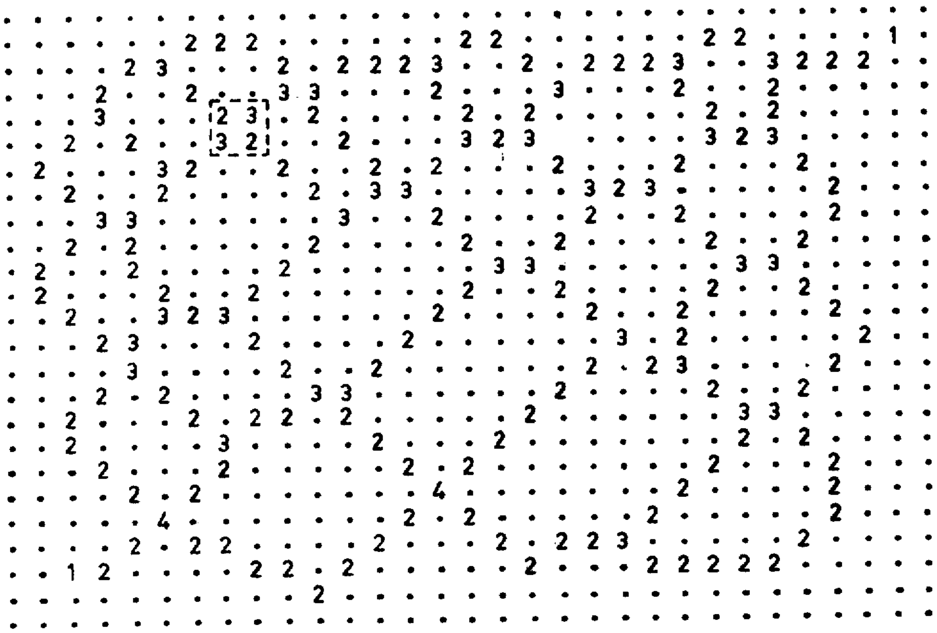
FIG. 3 shows the same as FIG. 1 for a complicated test character.

FIG. 3 shows a test character on a matrix where each position has eight neighboring positions, said test character having been skeletonized to a skeleton character having many mutually intersecting series of character positions. For each character position the number of series of character positions leading thereto is indicated.

The number of series starting from a character position can be readily determined. If the character position has 8 neighboring positions, it is counted how often a character position is directly followed by a background position. FIG. 2 shows that this number may be 0, 1 . . . 4. Only one difficult case remains, i.e. if four character positions form a block, such as in the broken-line block in FIG. 3. This may be viewed as a loop of four character positions, the preceding position of which each time neighbors the next one: this loop has the same symmetry as the regular pattern. In that case, as indicated, three of the four character positions can be marked as a connection point, and the remaining position can be marked as a four-stroke junction. It would also be possible to create two three-stroke junctions and two connection points, but this would complicate the structure of the character.

The sa: ie method can be used for the case where there are only four neighbors. In this case the ring to be formed by said four neighbors is to be supplemented with the four positions at the corners of a 3×3 matrix. Again the number of change-overs from character position to background position is counted during a round along this ring. This corresponds to the counting of the immediate neighbors, but the significant points can be thus determined for two different regular patterns (i.e. having four and eight neighbors) in the same way. The case involving four character positions forming one block is solved in the same way as the case involving eight neighbors.

In the case of a block, an advantage of the method set forth is that the counting of said number of times that a character position is directly followed by a background position during the round along said ring, never gives too high a number of said series of character positions starting from the examined character position, so that the information "four-stroke junction" indeed has to be added: this can be effected very readily by applying the information four-stroke junction, which can be obtained in two ways, to two inputs of a logic OR-circuit.

Figure 4:
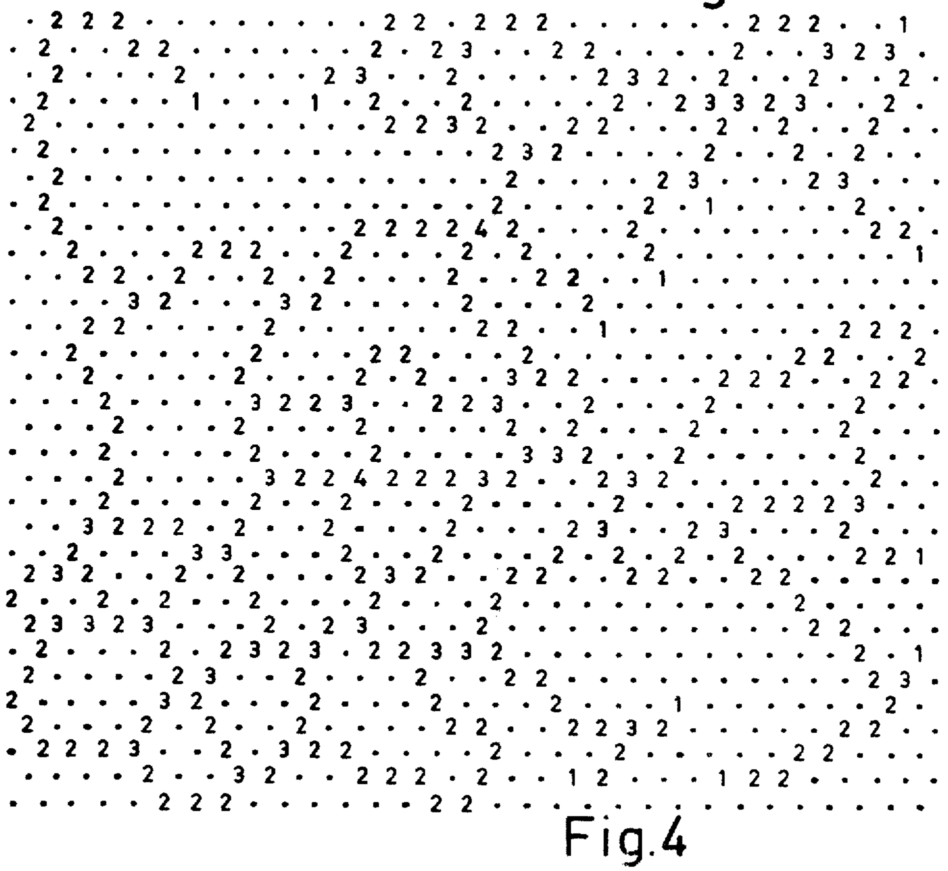
FIG. 4 shows the same as FIG. 3 on a matrix having six neighbors per position.

FIG. 4 shows a test character on a matrix where each character position has six neighbors. For determining the number of series starting from a character position (in this case a ring has six character positions which are always neighbours) it is again determined how many times in this ring a character position is followed directly by a background position. Therefore also in this case the same method is used as in the case of four and eight neighbours.

In this case loops of character positions also occur, which now consist each time of three character positions. The symmetry of this loop is the same as that of the pattern. If three character positions occur in a loop, they all have three or four neighboring character positions. The rule is that of a loop having its top at the upper side, the character position at the bottom left is changed into a four-stroke junction, while the other two character positions are changed into connection points.

In the case of a loop having its top at the lower side, the character position at the top right is marked as a three-stroke junction and the other two character positions are marked as connection points. If a character position forms part of two loops, three cases are possible: it can be viewed as a connection point in both cases, it can be viewed once as a three-stroke junction and once as a connection point, and it can be viewed twice as a three-stroke junction. In these cases it is considered to be a connection point, a three-stroke junction and a four-stroke junction, respectively. The latter case occurs twice in FIG. 4, If a different choice had been made, a different number of four-stroke junctions would have been obtained.

Figure 2A:
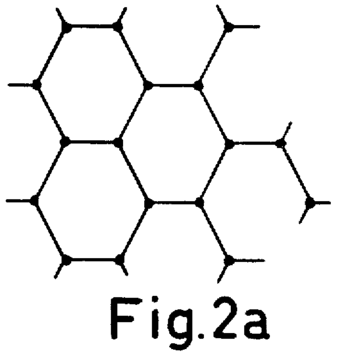
FIGS. 2A through 2D shows a number of regular patterns of positions.
Figure 2B:
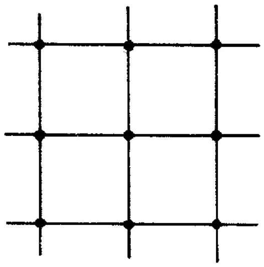
Figure 2C:
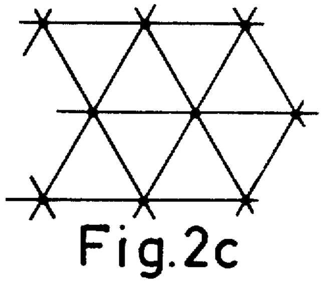
Figure 2D:
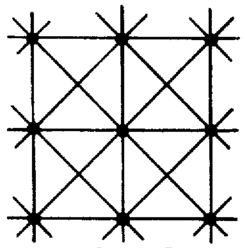

FIG. 2A shows a pattern with three neighbors per character position. In this pattern a ring is formed from these three neighbors, which are each time separated by a void position which is in principle unoccupied: the ring thus consists of six positions. Again it is counted how often a character positions is directly followed by a void position. This again corresponds exactly to the counting of the neighboring character positions, but the procedure is thus rendered independent of the pattern, which constitutes an advantage.

Figure 5:
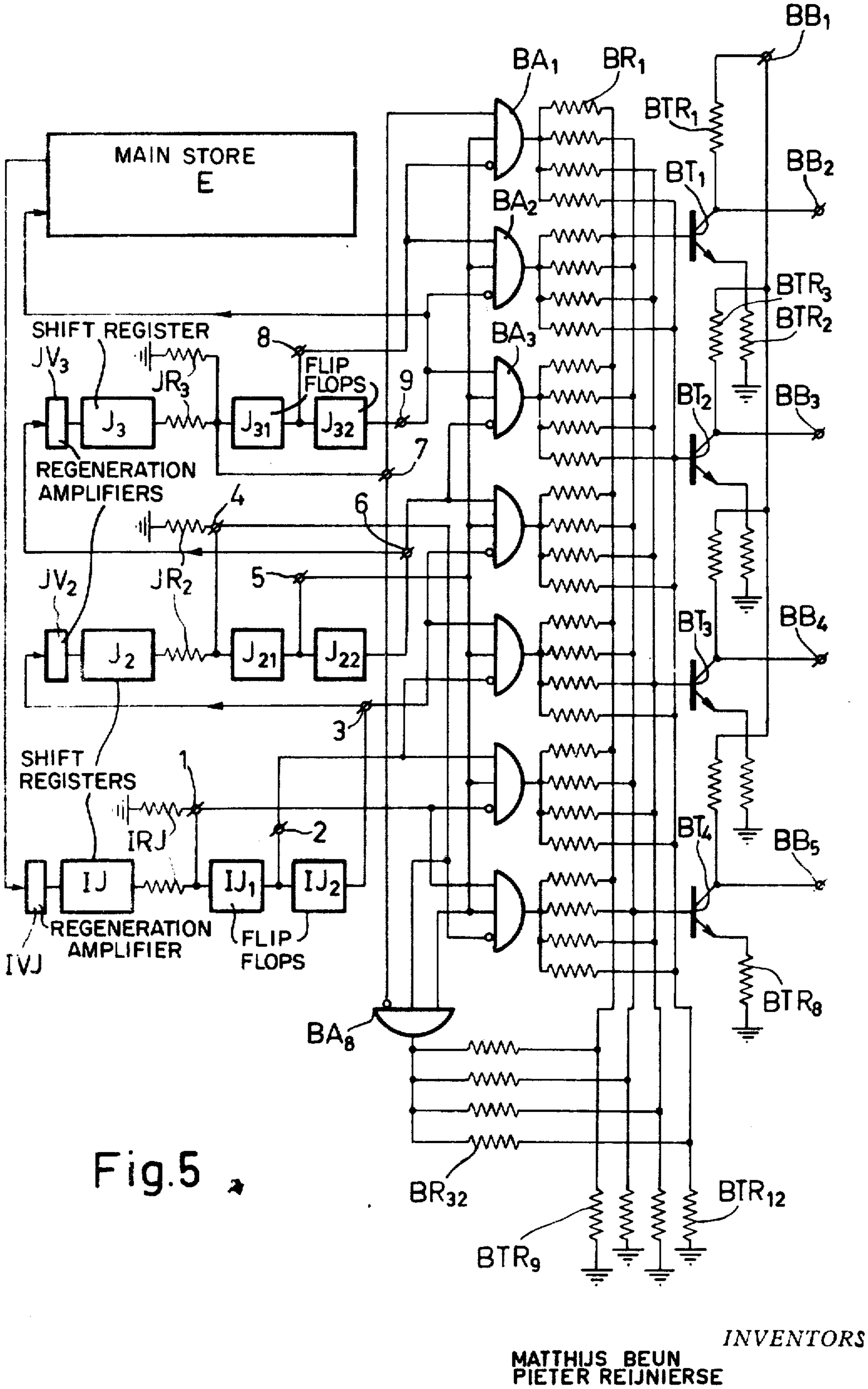
FIG. 5 shows a portion of a treatment device.

FIG. 5 shows a portion of a circuit arrangement by means of which it is determined whether a character position is and end point, a connection point or a junction. The regular pattern is that of FIG. 2D where each position has eight neighbors. The circuit is partly analogous to that shown in FIGS. 9 and 10 of Application Ser. No. 196,936 and U.S. Patent application Ser. No. 196,950 which has matured into U.S. Pat. No. 3,735,349 filed simultaneously with the present Application. The circuit arrangement comprises a main store E, three shift registers for 30 bits, IJ, J2, J3, comprising regeneration amplifiers IVJ, JV2, JV3, respectively, and terminating resistors IRJ, JR2, JR3, respectively. Connected to the outputs of the shift registers are each time two flip-flops in series, IJ1 and IJ2, J21 and J22, and J31 and J32, respectively. Also provided are eight logic AND-gates, BA1 . . . BA8, 32 resistors BR1 . . . BR32, four transistors BT1 . . . BT4, incorporating the resistors BTR1 . . . BTR8 in their respective emitter leads and collector leads, the voltage terminal BB1, and the information terminals 1, 2 . . . 9, BB1 . . . BB5.

The pattern on which the character is imaged comprises, for example, 32×32 positions, the information of which is supplied from the main store E one line after the other. Consequently, the information of three adjoining character positions is present on the terminals 1, 2 and 3. Terminal 3 is also connected to the input of the regeneration amplifier JV2, and hence to the shift register J2. Therefore, if the lines of information from E are directly read one after the other, the information of a block of 3×3 positions is present on the terminals 1 . . . 9. The circuit arrangement is designed to consider all eight neighbors of each character position as having the same weight for determining how many series of character positions lead to the point under consideration. To this end, the terminals 1 . . . 4, 6 . . . 9 are always connected to two of the AND-gates BA1 . . . BA8. The AND-gate BA3 receives, for example, the information present on terminal 9 in a non-inverted form, and the information present on terminal 6 in an inverted form. Moreover, the information of terminal 5 is also applied to said AND-gate. Therefore, the output signal of BA3 is high only if the signals of terminals 5 and 9 are high, and the signal of terminal 6 is low, i.e. if a change-over occurs from character position to background position when the terminals 1 . . . 4, 6 . . . 9 are passed in a clockwise manner. The output signals of the AND-gates are added by means of the resistors BR1 . . . B32, and are applied to the base electrodes of the transistors BT1 . . . BT4. These transistors are each time connected, via two of the resistors BTR1 . . . 8, to the terminal BB1 (to which a supply voltage is applied) and to ground. The resistors BTR1 . . . 8 are each time chosen such that BT1 becomes conducting if at least two of the AND-gates BA1 . . . 8 supply a high signal, BT2 becomes conducting if at least three of these gates supply a high signal, etc. It appears that under normal circumstances BT4 will never become conducting: five-stroke junctions do not occur. The output signals of the transistors BT1 . . . 4 are applied to the output signal terminals BB2 . . . 5.

Figure 6:
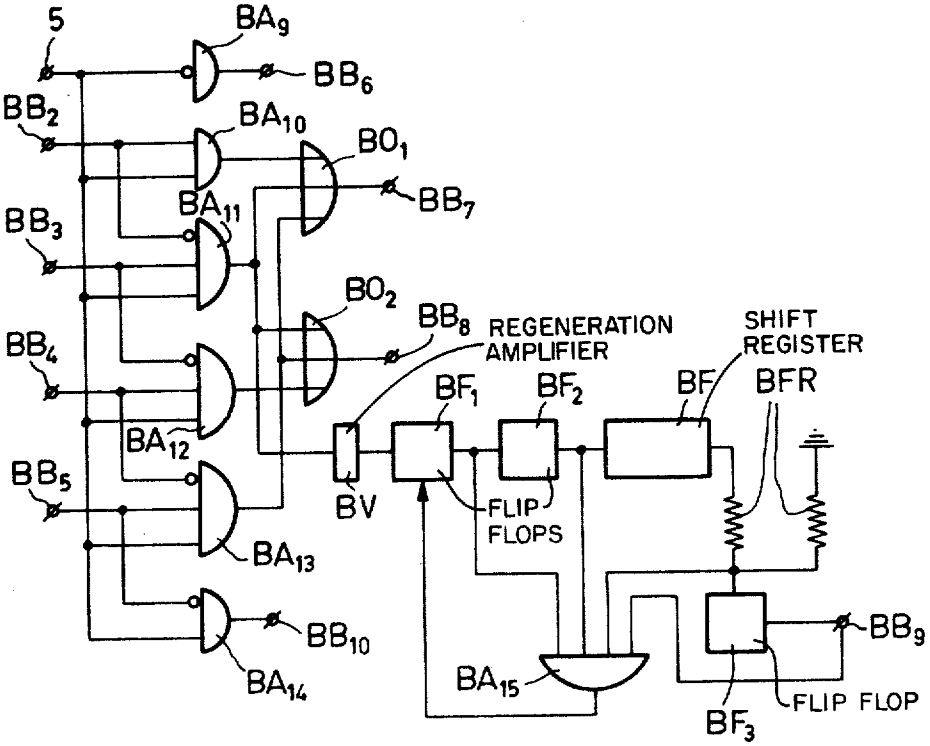
FIG. 6 shows an other portion of a treatment device having a quadrangle detector (special version of a loop detector).

FIG. 6 shows another portion of the circuit arrangement. The following code is chosen by way of example:

void point 000
end point 100
connection point 111
three-stroke junction 010 four-stroke junction 110

The code has been chosen rather at random, but the third bit 1 occurs only in the case of connection points. The circuit arrangement comprises five input signal terminals 5 and BB2 . . . 5, five output signal terminals BB6 . . . 10, seven logic AND-gates BA9 . . . 15, two logic OR-gates BO1, BO2, one regeneration amplifier BV, three flipflops BF1 . . . 3, and one shift register BF with matching resistors BFR.

The input signal terminals 5 and BBR2 . . . 5 are identical to, or are connected to, the output terminals 5 and BB2 . . . 5 shown in FIG. 5. The signal on terminal 5 is high if the associated position is a character position. AND-gate BA9 receives this information in an inverted form, so the signal on output terminal BB6 is high if terminal 5 relates to a background position. If only one of the AND-gates BA1 . . . 8 shown in FIG. 5 supplies a high signal, none of the transistors BT1 . . . 4 is conducting, and all the signals of the terminals 5 and BB2 . . . 5 are high. As one of these signals is always applied to the AND-gates BA9 . . . 14 in an inverted form, the output signals of all gates are low, except that of BA10 which makes the signal of output terminal BB7 high via the OR-gate BO1. The code "100" is thus determined because both other code bits can appear on the outputs of the OR-gate BO2 and the AND-gate BA13, respectively.

If the signal of two of the gates BA1 . . . 8 is high, the signal of terminal BB2 is low and the signals of BB3 . . . 5 are high. Consequently, only the three input signals of AND-gate BA11 are high (the signal of terminal BB2 is applied to BA11 in an inverted form) so that the OR-gates BO1 and BO2 receive a high signal, and the signals on the output terminals BB7 and BB8 are high: the code "111" is generated, which applies to a connection point because the input signal of the regeneration amplifier BV is then also high. In the case that a connection point forms part of a block of four character positions provisionally viewed as a connection point, this has been incorrectly because a four-stroke junction is present. Consequently, the input signal of the regeneration amplifier BV, representing the third bit of the code, is applied to a quadrangle detector which is formed by the AND-gate BA15. Always the third bits of successive character positions are shifted under the control of clock pulses not shown, through a shift register consisting of three flipflops BF1, BF2 and BF3, and the shift register BF. The latter has 31 bits, whilst the character may be imaged on a 32×32 matrix. Consequently, exactly one complete line of the matrix is present in BF and BF3 combined. If all of the output signals of the flipflops BF1, 2 and 3 and those of the shift register BF are high, a block of this kind is present. This is detected by the AND-gate BA15, and the output signal of BA15 resets flipflop BF1, the information contained therein then forming a "110" code.

If two of the transistors BT1 . . . 4 are conducting, the character position under consideration is a three-stroke junction, and AND-gate BA12 supplies a high signal with the result that terminal BB8 supplies a high signal: the code 010 is then formed.

If the transistors BT1 . . . 3 are conducting, the signals of terminals BB2 . . . BB4 are low and the signal of B5 is high. The code 110 is then formed by high signals on the terminals BB7 and BB8.

If the transistor BT4 is also conducting, more than four change-overs exist between a character position and a background position upon a round along the positions neighbouring those character positions. This is invalid: in that case the signal of output terminal BB10 of the AND-gate BA14 becomes high, which is an error signal. In that case, for example, the round along the character may be repeated.

Figure 1:
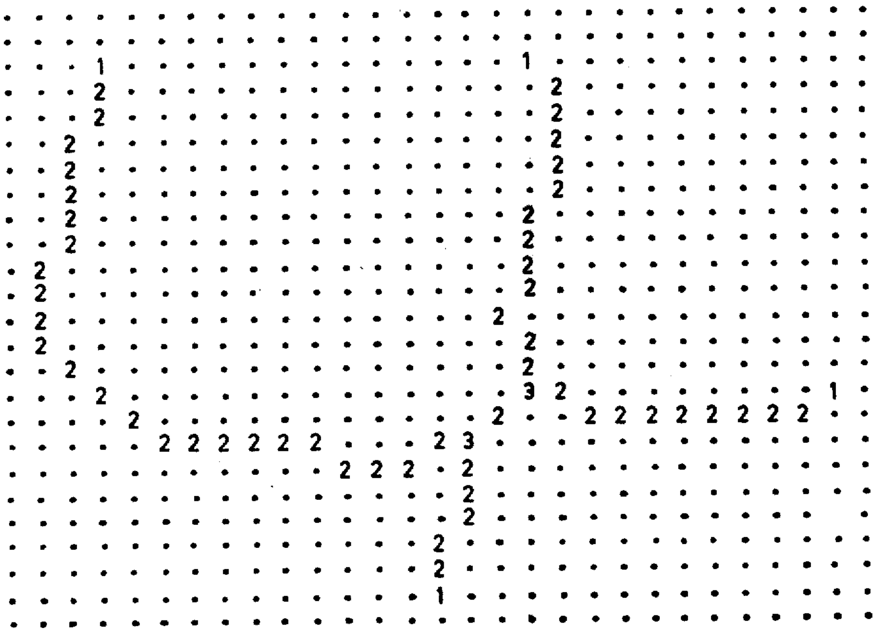
FIG. 1 shows a matrix where each position has eight neighboring positions, and on which a character "4" is imaged, the number of series of character positions leading to a character position being indicated for each character position.

The foregoing is one possible embodiment; other embodiments will be obvious to those skilled in the art, also in the case of six neighbouring positions where two triangle detectors are present. The outputs thereof are connected in an additional logic unit which detects whether two character positions to be marked as a three-stroke junction coincide. It is also possible to combine three-stroke or four-stroke junctions into four- or more-stroke junctions if they are situated near enough together. This may be useful as skeletonizing often changes two intersecting stroke elements in two closely adjoining three-stroke junctions (compare FIG. 1). Combinations to form five-stroke and six-stroke junctions are also possible.

What is claimed is:

1. A method of determining significant points of characters comprising the steps of imaging a character on a two dimensional regular pattern of positions, deriving digital information to distinguish a character position from a background position, determining by the use of information stored in a machine memory which character positions are associated with associated skeleton characters of said characters, said skeleton characters comprising stroke elements consisting of a single series of character positions which succeed each other in accordance with an adjacency criterion, each position having at least six adjacent positions forming a ring thereabout, counting, by the use of appropriate machine elements, the number of times a character position is directly followed by a background position during a cycle of the at least six positions of said ring around a character position, and determining from said number the number of stroke elements which start from this character position.

2. A method as claimed in claim 1 wherein a loop of character positions may occur, said loop being a series of character positions which succeed each other in accordance with said adjacency criterion, said series having the smallest possible length in said regular pattern and being shorter than said ring, said method including the step of marking all but one of said character positions of said loop with the characteristics of connection points and marking the remaining character position with the characteristics of a junction from which as many of said series of character positions start as said loop has character positions.

3. A character recognition device, comprising a memory containing digital information obtained from the image of a character on a two dimensional regular pattern of positions for distinguishing a character position from a background position and containing information of said character for determining which character positions are associated with skeleton characters; means for accessing said character distinguishing and skeleton character associating information from said memory and digital comparator means connected to said memory accessing means for comparing information of positions of a ring of at least six positions encompassing a central character position, said at least six positions being adjacent to said central character position and means for counting, during a cycle about said ring, the number of times a character position is directly followed by a background position, said counting means generating an output signal corresponding to the counted number of times a character position is directly followed by a background position to determine from said counted number of times the number of stroke elements which start from said central character position.

4. A device as claimed in claim 3 including means for marking with predetermined characters a loop of characters when they occur, said loop being a series of characters positions which succeed each other in accordance with an adjacency criterion, said series having the smallest possible length in the pattern of positions and the same symmetry as said pattern, said device further comprising a loop detector associated with said comparator means for receiving information of all character positions associated with a loop and for generating a junction output signal by which the information of one of the character positions of said loop is changed into that of a junction from where as many of a series of character positions start as said loop comprises character positions.

5. A device as claimed in claim 4 further comprising a coincidence detector for detecting whether at least two junctions are situated within a given maximum distance and for producing a signal upon detection of these junctions, and a coupling device for receiving the detection signal and also memory information of those junctions, and which associates additional information with the information of a character position, said coupling device also then marking said character position as at least a four-stroke junction, and changing other junctions, detected by the coincidence detector, into connection points.

* * * * *